United States Patent [19]

Lieber et al.

[11] Patent Number: 5,541,725
[45] Date of Patent: Jul. 30, 1996

[54] METHOD AND DEVICE FOR TESTING A PLURALITY OF OPTICAL WAVEGUIDES

[75] Inventors: Winfried Lieber, Offenburg; Thomas Wartmann, München, both of Germany

[73] Assignee: Siemens Aktiengesellschaft, Munich, Germany

[21] Appl. No.: 284,498

[22] PCT Filed: Feb. 1, 1993

[86] PCT No.: PCT/DE93/00077

§ 371 Date: Aug. 4, 1994

§ 102(e) Date: Aug. 4, 1994

[87] PCT Pub. No.: WO93/16336

PCT Pub. Date: Aug. 19, 1993

[30] Foreign Application Priority Data

Feb. 5, 1992 [DE] Germany ............... 42 03 259.8
Dec. 21, 1992 [DE] Germany ............... 42 43 388.6

[51] Int. Cl.⁶ .............. G01N 21/59; G01N 21/84
[52] U.S. Cl. ........................................ 356/73.1
[58] Field of Search ................................ 356/73.1

[56] References Cited

U.S. PATENT DOCUMENTS 4,990,770  2/1991  Hemmann et al. ......... 356/73.1 X
5,040,866  8/1991  Engel .

FOREIGN PATENT DOCUMENTS 2602594   2/1988   France .
3624653   1/1988   Germany .
3911429  10/1990   Germany .
3429947   3/1991   Germany .
150134    7/1987   Japan .................... 356/73.1
2157846  10/1985   United Kingdom .

OTHER PUBLICATIONS

Andersen et al, "Lightwave Splicing and Connector Technology", *AT&T Technical Journal*, vol. 66, No. 1, Jan.–Feb. 1987, pp. 45–64.

*Patent Abstracts of Japan*, vol. 7, No. 42 (P177) (1187) 19 Feb. 1983 of Japanese 57–192911 (Nov. 27, 1982).

*Patent Abstracts of Japan*, vol. 13, No. 583 (P981) (3931) Dec. 22, 1989 of Japanese 1-246512 (Oct. 2, 1989).

*Patent Abstracts of Japan*, vol. 8, No. 38 (P-255) (1475) Feb. 18, 1984 of Japanese 58–191947, (Nov. 9, 1983).

*Patent Abstracts of Japan*, vol. 11, No. 299 (P621) (2746) Sep. 29, 1987 of Japanese 62–91832 (Apr. 27, 1987).

*Primary Examiner*—Vincent P. McGraw
*Attorney, Agent, or Firm*—Hill, Steadman & Simpson

[57] ABSTRACT

The coupling device (KR1) of an optical receiver (OR1) is designed in such a manner that at least two optical waveguides (LW1, LW2) are insertable alongside one another into said coupling device in an ordered structure. At least two light-sensitive elements (LE1, LE2) are spatially associated with the coupled-out radiation fields (SF1, SF2) so that the test signals (RS1, RS2) are separately evaluatable.

29 Claims, 8 Drawing Sheets

METHOD AND DEVICE FOR TESTING A PLURALITY OF OPTICAL WAVEGUIDES

BACKGROUND OF THE INVENTION

The invention relates to a test device for optical waveguides using an optical receiver which exhibits a coupling device as well as a light-sensitive element disposed in the radiation field of an emission signal to be coupled out and with which an evaluating device is associated.

A test device of this type is disclosed in DE-C2-34 29 947. It permits the assessment of a splice position of an individual optical waveguide. An emission signal is injected by means of a coupling device into the optical waveguide ahead of the splice position and is coupled out, after the splice position, on the reception side by means of a second coupling device. The exit field of the coupled-out emission signal is received by a photodiode and subsequently displayed.

If a plurality of optical waveguides were inserted into this known test device, then it would be possible to measure only the common, superposed sum of the individual radiation fields of the optical waveguides. It would not be possible to draw from this superposition sum conclusions as to the selective, characteristic individual radiation fields of the inserted optical waveguides, since a functional dependence between the selective test variables and the superposed sum cannot be derived. An individual statement, for example, as to the splice attenuation of a specific optical waveguide within a test device according to the prior art is not possible.

DE-A1-39 11 429 discloses a device for aligning two fiber ends of optical waveguides in a splice position. Shadow images of the two optical waveguide ends are generated by an illumination of the two fiber ends of a single optical waveguide from outside. These two shadow images are received by at least two stationary, separate photosensitive surfaces, which are disposed along the longitudinal axis of the optical waveguide. A control variable for a positioning device for the in-line alignment of the fiber ends is derived from the separate electrical test signals generated by the photosensitive surfaces, by comparison. Statements concerning characteristic quantities describing the transmission behavior of the optical waveguide are not possible with such a device. In particular, no splice attenuation testing can be carried out in this manner.

SUMMARY OF THE INVENTION

The object of the invention is to specify a test device by means of which the characteristic quantities reproducing the transmission behavior, of a plurality of optical waveguides and/or their spatial position can be tested selectively in a simple and reliable manner.

In the case of a test device of the initially mentioned type, this object is achieved in that the coupling device is designed in such a manner that at least two optical waveguides are insertable in an ordered structure alongside one another so that they exhibit independent radiation fields lying alongside one another, in that at least one second light-sensitive element is provided, in that these at least two light-sensitive elements are disposed and aligned with respect to their reception characteristics in such a manner that they pick up different parts of said radiation fields, and in that in the evaluating device those test signals of the individual radiation fields which are recorded by the individual light-sensitive elements are separately evaluated.

The invention improves the possibilities for the selective evaluation of the received radiation fields of a plurality of optical waveguides with respect to their selective optical transmission characteristic quantities and/or spatial position. The additional expenditure required to this end, i.e. the utilization of a plurality of light-sensitive elements, does, in contrast, remain negligible. An advantage of a test device according to the invention resides especially in that, even with a single test process, a gain in test information for each individual optical waveguide or for a group of pertinent optical waveguides is achieved.

While with the known test device, with only a single light-sensitive element for n optical waveguides n individual measurements would have to be made in succession, in order to obtain the individual optical transmission characteristic quantities, in the case of the invention only a single test process would be required. This has the effect of reducing the operating expenditure for the selective testing of the optical transmission characteristic quantities (for example, the attenuation of the optical waveguides or the splice attenuation at a connection position) per optical waveguide to a considerable extent with a simultaneous reduction of the time required for testing.

Preferably, a flexural coupler can be used as reception-side coupling device. However, it is in many cases also expedient to provide other coupling devices. Thus, by way of example, light can also be coupled out at the end side (i.e. at the end-face end) of the optical waveguides. This is expedient in particular in the case of path attenuation tests, where the ends of the optical waveguides are accessible.

Where, according to an expedient further development of the invention, in the case of more than two optical waveguides in the test device, the number of light-sensitive elements is smaller than the number of the optical waveguides to be investigated, the characteristic optical transmission quantities of each individual optical waveguide can be determined, in a manner selectively improved as compared with the prior art, with a greater spatial resolution.

The optical transmission characteristic quantities can be tested with particular precision selectively for each optical waveguide if, in a further expedient further development, the number of light-sensitive elements is selected to be equal to the number of optical waveguides to be investigated.

Where, according to another advantageous refinement of the invention, finally, the number of light-sensitive elements is selected to be greater than the number of pertinent optical waveguides, the optical transmission characteristic quantities can be determined selectively with precision with further improved spatial resolution as compared with the other two mentioned cases, an unambiguous association between the optical waveguides and the light-sensitive elements not being required.

In all three recited further developments of the invention, it is also possible to test not all existing optical waveguides, but only specified groups of pertinent optical waveguides, such as for example individual optical waveguide bands, simultaneously and selectively with respect to their individual optical transmission characteristic quantities.

According to an additional expedient further development of the invention, the selective optical transmission characteristic quantities of the optical waveguides even of an optical waveguide band can be selectively tested by means of a device according to the invention, without having to release the optical waveguides in each instance from the band structure and to test them. Furthermore, such a releasing is in general scarcely possible.

The invention also relates to a method for testing the optical characteristic quantities by means of a test device of the initially mentioned type, which method is characterized in that at least two optical waveguides are inserted alongside one another into the coupling device of the optical receiver in an ordered structure so that independent radiation fields lying alongside one another are formed, in that the light-sensitive element and at least one second light-sensitive element are aligned with respect to their reception characteristics in relation to the radiation fields in such a manner that by these at least two light-sensitive elements different parts of said radiation fields are picked up, and in that by the light-sensitive elements selective test signals which correspond to the respective radiation fields are received and subsequently separately evaluated.

Other further developments of the invention are reproduced in subclaims.

The invention and its further developments are explained in greater detail hereinbelow with reference to drawings.

DESCRIPTION OF THE PREFERRED EMBODIMENTS

Figure 1:
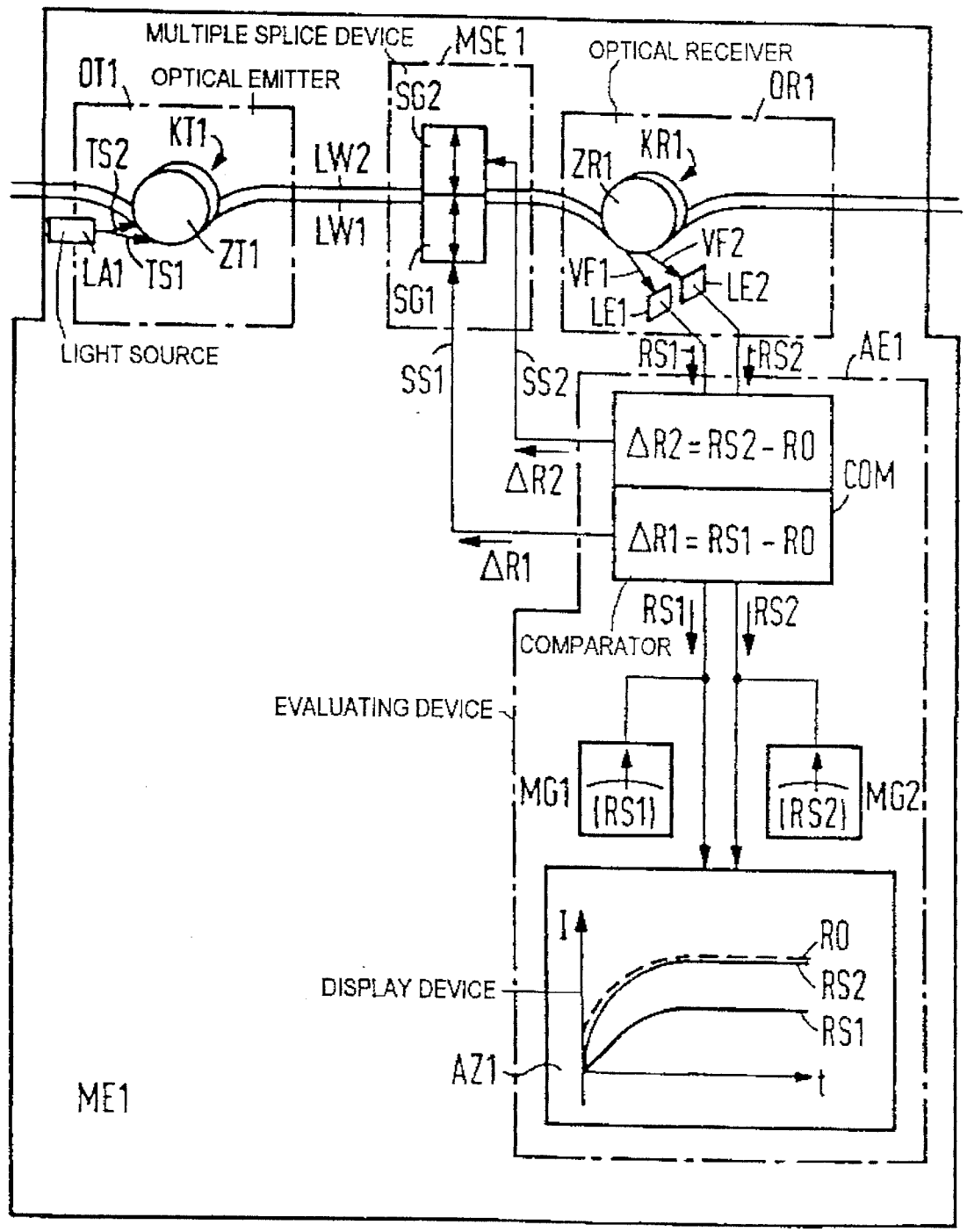
FIG. 1 shows in a diagrammatic representation of a basic overall structure of a test device according to the invention with two optical waveguides and two light-sensitive elements, FIG. 2 diagrammatically shows the reception conditions of the optical receiver according to FIG. 1 with two radiation fields and two light-sensitive elements.

FIG. 1 shows a test device ME1 according to the invention, comprising the components of an optical emitter OT1, a splice device MSE1, an optical receiver OR1 and an evaluating device AE1. Expediently, these components are combined into a test device ME1, for example in the form of a test box, or are for exhale a component part of an optical waveguide splicing system or of an attenuation testing system. The following embodiments all relate to the splice attenuation of optical waveguides. Besides this particularly advantageous field of application of the invention, there is however also the possibility of employing the invention for the testing of further optical transmission characteristic quantities, for example for phase transit times, impulse responses, path attenuation etc.

Two optical waveguides LW1 and LW2 to be spliced are inserted alongside one another into the test device ME1. In the optical emitter OT1 of FIG. 1, light is coupled in via a coupling device KT1 by means of a light source LA1 into the two optical waveguides LW1 and LW2. The optical emitter OT1 exhibits either only a single light source, to which all optical waveguides LW1, LW2 to be tested are coupled in common, or a specifically associated light source for each optical waveguide LW1, LW2 to be coupled on. The two emission signals TS1 for the optical waveguide LW1 and TS2 for the optical waveguide LW2 are symbolically indicated by in each instance an arrow. For the following embodiments in relation to FIG. 1, let it be assumed that the optical emission signal TS2 is precisely as great as the emission signal TS1, i.e. that both signal levels coupled in are equal.

The coupling in takes place in accordance with the flexural coupler principle, i.e. the optical waveguides are laid around a cylinder ZT1 and the light signal TS1 enters tangentially into the optical waveguide LW1 and the light signal TS2 enters tangentially into the optical waveguide LW2. By way of an alternative to the flexural coupler principle, the emission signals TS1 and TS2 can also be injected directly via the open end faces of the optical waveguides LW1 and LW2. Advantageously, they can originate as in FIG. 1 from a specifically provided test emitter, such as for example the light wave LA1, but they can also be message signals from the optical waveguides LW1 and LW2. The two optical emission signals TS1 and TS2 pass through the two optical waveguides LW1 and LW2 via the multiple splice position MSE1 to the reception side.

Figure 2:
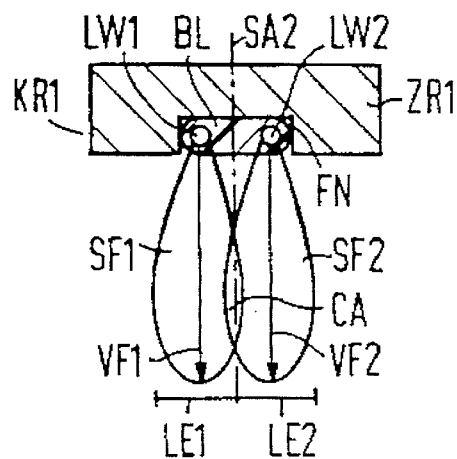

A proportion of the signals are coupled out from an optical receiver OR1 by means of a second coupling device KR1 preferably for example in accordance with the flexural coupler principle in an approximately tangential direction. To this end, the optical waveguides LW1, LW2 are laid around a cylinder ZR1 in a similar manner to the emission side. In order to obtain selectively for the two emission signals TS1 and TS2 and to obtain two separate associated reception signals RS1 and RS2, the optical waveguides LW1 and LW2 are laid, on the reception side, in such a manner around the cylinder ZR1 of the coupling device KR1 that two independent radiation fields SF1 and SF2 lying independently alongside one another, with field SF1 for the emission signal TS1 and field SF2 for the emission signal TS2, are the result, as illustrated in FIG. 2. The principal radiative emission directions of the radiation fields SF1 and SF2 are identified in FIGS. 1 and 2 by the magnitude and direction of the respectively associated radiation vectors VF1 and VF2. The two radiation fields SF1 and SF2 can be at least partially picked up selectively by two light-sensitive elements, LE1 for the radiation field SF1 and by LE2 for the radiation field SF2. The radiation fields SF1 and SF2 are converted into electrical test signals RS1 and RS2 in the light-sensitive elements LE1 and LE2 and are fed in each instance separately via two lines to a common evaluating device AE1. The two light-sensitive elements LE1 and LE2 are disposed symmetrically in relation to the plane of symmetry SA2 of the radiation fields SF1 and SF2, as shown in FIG. 2. The light-sensitive element LE1 does also indeed receive a part of the radiation of the optical waveguide LW2 and, conversely, the light-sensitive element LE2 receives a part of the radiation of the optical waveguide LW1. With a symmetrical arrangement of the light-sensitive elements LE1 and LE2 with respect to the plane of symmetry SA2 and identical radiation fields SF1 and SF2, the coupled-over light components can however be wholly or partially eliminated, possibly by formation of the difference of the two signals RS1 and RS2 (RS1–RS2). It is however also possible to achieve from the outset a complete decoupling of the radiation fields SF1 and SF2, in that for example shields are employed (in this connection, see FIGS. 7 and 8).

A comparator COM in the evaluating device AE1 compares the received test signals RS1 and RS2 independently of one another with a common theoretical value R0. The analogue, tested reception signals RS1 and RS2 are imaged in common in a display device AZ1 in comparison with the reception signal R0 which is optimally to be expected. The instantaneous recording shows the corresponding intensities I of the coupled-out emission signals RS1 and RS2 in comparison with the optical theoretical test curve R0 as a function of the time t. In the present case, the intensity test curve for the received emission signal RS1 proceeds below the theoretical value intensity curve R0, i.e. for the fiber ends of the optical waveguide LW1 in the multiple splice device MSE1 no optimal alignment has yet been attained. On the other hand, for the optical waveguide LW2 the tested intensity progression for the received emission signal RS2 is approximately identical to the theoretical value curve R0, i.e. the two cores of the fiber ends of the optical waveguide LW2 are aligned onto one another adequately in line.

From the difference between the reception signal RS1 and the theoretical value R0, an actuating signal ΔR1=(RS1–R0) can possibly be generated, which signal is then fed via the line SS1 to the partial control element SG1 for the optical waveguide LW1. After attainment of optimal alignment, the difference and thus the actuating signal ΔR1 become 0. A similar procedure is followed with the difference (ΔR2= RS2–R0) derived from the reception signal RS1 and the theoretical signal R0, which is fed via the line SS2 to the partial control element SG2. Besides this, in place of the parallel actuating signal feeding via two lines SS1 and SS2, a serial transmission of the actuating signals to the control elements SG1 and SG2 via a single line can also take place; in this case, upon the signal change from (RS1–R0) to (RS2–R0), a switchover is to take place from the control element SG1 to the control element SG2.

In place of the display device AZ1 or by way of supplement thereto, two separate test display devices MG1 and MG2 (for example, two pointer instruments) can be provided, which separately display the two signal levels RS1 and RS2.

In place of an automatic adjustment of the two fiber ends of the optical waveguides LW1 and LW2 at the multiple splice location MSE1, a manual adjustment can also be carried out there. To this end, an operator reads the displays of the test devices MG1 and MG2 and/or of the display device AZ1, and actuates the control elements SG1 or SG2 respectively.

If there is already a plurality of finished splice connections (for example, as a result of a simultaneous multiple splice connection in an optical waveguide band BL including the optical waveguides LW1 and LW2 (see FIG. 2)), then the quality of this splice connection can be assessed using the test device according to the invention. If, by way of example, the splice connection of the optical waveguide LW1 has failed, then, as shown in the case of the display device AZ1, the signal RS1 would lie considerably below the theoretical value R0. In this case, a readjustment cannot indeed be carried out any longer; however, there is the possibility of cutting out the splice location and repeating the splicing process until the tolerance values are observed, i.e. until both the signal RS1 and also the signal RS2 lie sufficiently close to the theoretical value R0. In the display device AZ1, the signal RS1 then lies where the signal RS2 now lies.

For the sake of better illustration, in FIG. 2 a diagrammatic and enlarged cross sectional image representation has been selected for the cylinder ZR1 of the coupling device KR1 with a guide groove FN. This representation shows the optical waveguide strip line BL comprising the two optical waveguides LW1 and LW2 in the guide groove FN from an elevation which is obtained if the optical waveguides are cut transversely to their longitudinal axis. The strip line BL is held in the cylinder ZR1 laterally in the guide groove FN, in order during the test process to prevent to a large extent a displacement of the optical waveguide positions which is lateral with respect to the optical waveguide longitudinal axes. To this end, expediently, the guide groove FN is designed for example with respect to its depth and width so that the optical waveguide strip line BL is fixed by the groove FN. At the same time, the two optical waveguides LW1 and LW2 in the guide groove FN experience the same curvature, so that identical coupling-out conditions (e.g..identical radii of curvature) are applicable to both. In this case, it is presumed that the coatings of both optical waveguides are identical. If differing coupling-out conditions are also present for example due to differing color coating, then this can also be taken into consideration for example in the form of a corresponding correction value. With the aid of these measures, approximately constant test conditions are assured.

In the strip line BL, for the sheathing of which preferably a plastic such as for example urethane acrylates, Pe, PB is selected, the optical waveguides LW1 and LW2 are mechanically connected to one another, parallel alongside one another. In this way, it is achieved that the radiation fields SF1 and SF2 coupled out from the optical waveguides LW1 and LW2 lie independently and without dependence likewise parallel alongside one another. For the sake of better illustration, FIG. 2 represents the radiation fields SF1 and SF2 and the light-sensitive elements LE1 and LE2 folded down through 90°. The two radiation fields SF1 and SF2 are in each instance indicated by a radiation lobe. Direction and strength of the maximum energy density of the radiation field SF1 or SF2 respectively are in each instance identified by magnitude and direction of the radiation vector VF1 or VF2 respectively. In a plane transverse to these principal radiative emission directions (identified by the radiation vectors VF1 and VF2) of the radiation fields SF1 and SF2, the two light-sensitive elements LE1 and LE2 are positioned stationary or adjusted respectively. The reception characteristics of the two light-sensitive elements LE1 and LE2 are aligned symmetrically with respect to the plane of symmetry SA2 of the radiation fields SF1 and SF2 so that the two radiation vectors VF1 and VF2 stand in each instance vertically on their centers. In this way, it is guaranteed that the light-sensitive elements LE1 and LE2 pick up in each instance different parts of the radiation fields SF1 and SF2. The light-sensitive element LE1 is adjusted so that in the absence of the radiation field SF2 the photocurrent from the radiation field SF1 is a maximum. In a similar way, the element LE2 is adjusted so that in the absence of SF1 the photocurrent from SF2 becomes a maximum. Since however in a region CA there is a coupling-over of the light components, the light-sensitive element LE1 also receives a part of the radiation of the optical waveguide LW2 and conversely the light-sensitive element LE2 receives a part of the radiation of the optical waveguide LW1. On account of the symmetrical arrangement or due to the use of a shield (see FIGS. 7 and 8) between the light-sensitive elements LE1 and LE2, it is however possible to decouple fully the radiation fields SF1 and SF2. A further advantageous boundary condition for radiation fields SF1 and SF2 which lie alongside one another as far as possible without superposition is also then present in the event that the radiation vectors VF1 and VF2 diverge greatly from one another.

It is thus possible in all cases to guarantee a sufficiently clear association of the optical waveguides LW1 and LW2 or their pertinent radiation fields SF1 and SF2 with the light-sensitive elements LE1 and LE2, so that the optical characteristic quantities can be precisely determined selectively.

Figure 4:
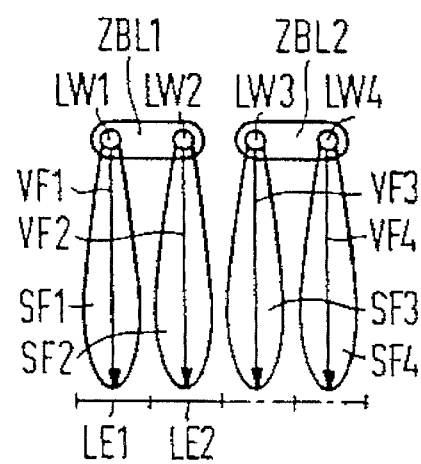
Figure 3:
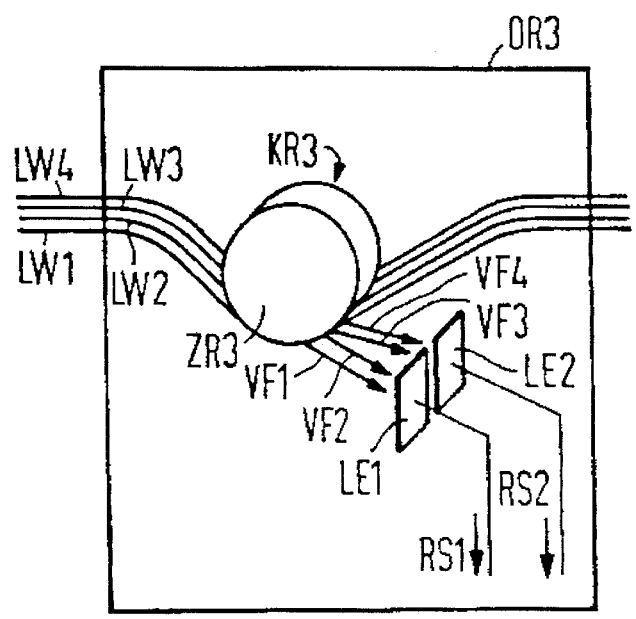
FIG. 3 shows in a diagrammatic representation of an optical receiver according to the invention with four optical waveguides and two light-sensitive elements, FIG. 4 diagrammatically shows the reception conditions of the optical receiver according to FIG. 3 with two light-sensitive elements.
Figure 5:
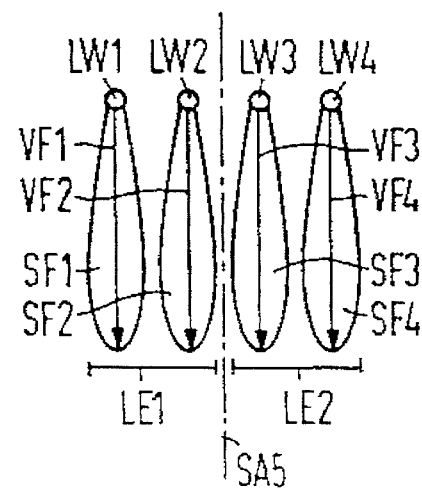
FIG. 5 shows in a diagrammatic representation of a modification of the reception conditions according to FIG. 4.

In FIG. 3, in the optical receiver OR2, in a similar way to FIG. 1, four optical waveguides are laid, parallel alongside one another, around the cylinder ZR3 of the coupling device KR3. Four radiation fields SF1 to SF4 are coupled out from the four optical waveguides LW1 to LW4, according to the flexural coupler principle. These are indicated via their radiation vectors VF1 to VF4. The two light-sensitive elements LE1 and LE2 for reception stand opposite the four radiation fields SF1 to SF4 in the coupling-out region. Thus, this involves a variant of the invention, in which the number of light-sensitive elements is smaller than the number of optical waveguides to be investigated. The light-sensitive elements LE1 and LE2 convert the light energy received proportionately from the four radiation fields SF1 to SF4 into the two electrical test signals RS1 and RS2. The latter can be utilized in the following manner in an evaluating device AE1 similarly to FIG. 1, for the selective determination of the optical characteristic quantities of the optical waveguides LW1 to LW4:

In FIG. 4, the radiation fields SF1 and SF2 of a group of pertinent optical waveguides LW1 and LW2, which are combined into a dual strip line ZBL1, are picked up in a manner which is independent and without dependence upon one another by the two light-sensitive elements LE1 and LE2. The manner of representation of FIG. 4 and of the following FIG. 5 is selected to be similar to FIG. 2. Since this involves a clear association of the radiation field SF1 with the light-sensitive element LE1 and of the radiation field SF2 with the light-sensitive element LE2 or the test signal RS2, in a similar way to FIGS. 1 and 2 a selective and individual determination of the optical transmission characteristic quantities of a group of optical wave-guides LW1 and LW2 is possible with precision. If the optical characteristic quantities of a further group of optical waveguides LW3 and LW4, e.g. of a dual strip line ZBL2, are of interest, then these can be determined in the same way, in that the two light-sensitive elements LE1 and LE2 are displaced into a position shown in chain-dotted lines in FIG. 4, and are positioned. The test signal RS1 then corresponds to the light energy of the radiation field SF3 and the test signal RS2 to the light energy of the radiation field SF4. In place of a displacement of the light-sensitive elements LE1 and LE2, the cylinder ZR3 of the coupling device KR3 together with the optical waveguides can also be displaced in its longitudinal axis so that the radiation fields SF3 and SF4 impinge on the stationary, light-sensitive elements LE1 and LE2.

In FIG. 5, the two light-sensitive elements LE1 and LE2 are disposed symmetrically in relation to the plane of symmetry SA5 of the two groups of optical waveguides LW1/LW2 and LW3/LW4. The radiation fields SF1 and SF2 impinge, with respect to their principal radiative emission directions, in each instance in common on the light-sensitive element LE1 vertically, while the radiation fields SF3 and SF4 fall onto the light-sensitive element LE2. The electrical test signal RS1 then corresponds to the superposed sum of the two radiation fields SF1 and SF2, and the electrical test signal RS2 to the superposed sum of the two radiation fields SF3 and SF4. In this way, what is obtained in each instance is a test value for each group of optical waveguides. Test results obtained groupwise in this manner are more evidentially cogent than a single test of all radiation fields with a single light-sensitive element.

Within the context of a splicing process, such a qualitative statement concerning a group of optical waveguides is already sufficient for example in particular where, for example, this group has been combined into a strip line. In this case, at all events, the splice connection of all optical waveguides of the respective strip line must in fact be separated and newly set up.

Figure 6:
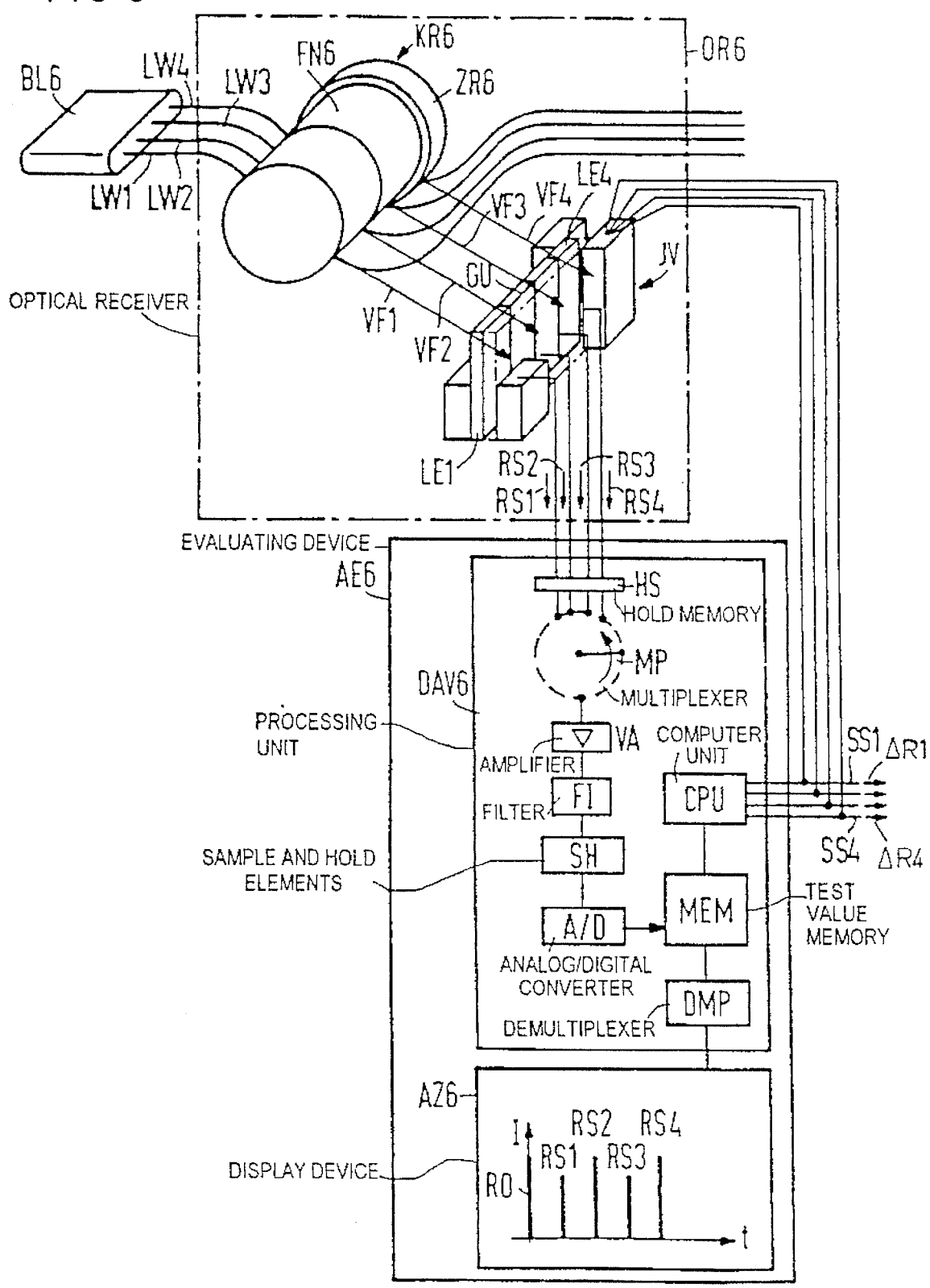
FIG. 6 shows in a diagrammatic representation of a second embodiment of the test device according to the invention with four optical waveguides and four light-sensitive elements.

FIG. 6 diagrammatically shows a second embodiment of the test device according to the invention with four optical waveguides LW1 to LW4, four light-sensitive elements LE1 to LE4 and a digital evaluating device AE6, which exhibits a digital readout and processing unit DAV6 and a display device AZ6. The emission part, which is designed in a similar manner to FIG. 1, has been omitted in this case, in order to simplify the representation. The four optical waveguides LW1 to LW4 are combined into a group in the form of a strip line BL6, the outer envelope of which is indicated in the left-hand part of FIG. 6 and, in the remaining part of the figure, has been omitted for the sake of clarity, and are mechanically fixed parallel alongside one another. This group is inserted into the guide groove FN6 of the cylinder ZR6 of the coupling device KR6. From four optical waveguides LW1 to LW4, the four radiation fields SF1 to SF4, represented in FIG. 6 with respect to their principal radiative emission directions by four radiation vectors VF1 to VF4, are coupled out according to the flexural coupler principle. They impinge in each instance on the light-sensitive elements LE1 to LE4 associated with them in a plane transverse to the principal radiative emission directions VF1 to VF4. Their reception characteristics are clearly associated in each instance with the radiation vectors VF1 to VF4 of the radiation fields SF1 to SF4 and are directed in each instance onto these so that at least in each instance the main component of the respective radiation field can be received. The light energy of the radiation fields SF1 to SF4 is converted by the light-sensitive elements LE1 to LE4 in each instance into the electrical test signals RS1 to RS4.

These are stored in a hold memory HS of the readout and processing unit DAV6 at least for four clock periods of a downstream multiplexer MP. The multiplexer MP reads out the individual test signals RS1 to RS4 in four clock periods in succession in time one after the other from the hold memory HS. Subsequently, the continuous test signals RS1 to RS4 are passed serially via an amplifier VA and are freed from extraneous signals by means of a filter FI. The continuous test signals RS1 to RS4 are discretized by means of a sample and hold element SH and an analog/digital converter A/D and filed in a test value memory MEM. The further signal processing of the test signals RS1 to RS4 is undertaken by a computer unit CPU, which links the recorded test signals functionally with one another, so that for each optical waveguide LW1 to LW4 the pertinent optical transmission characteristic quantities are selectively determinable.

For the visual assessment of the optical transmission characteristic quantities such as for example the splice attenuations, these are read out from the test value memory MEM and fed via a demultiplexer DMP to a display device AZ6. The discrete time-division multiplex test signals RS1 to RS4 are imaged in common in the latter in comparison with a theoretical value R0 to be optimally expected. The progressive instantaneous recording shows the intensities I of the four test signals RS1 to RS4 in comparison with the common theoretical value R0 as a function of the time t. These test values RS1 to RS4 describe in each instance the integral sum of the quantity of light of the coupled-out radiation fields SF1 to SF4. The test signals RS2 and RS4 are in agreement with the optimal theoretical value R0. With respect to the assessment of splice attenuations, the splices are thus optimally executed in the optical waveguides LW2 and LW4. The two test values RS1 and RS3 lie, in contrast, below the optimal theoretical value R0, i.e. optimal splice connections have not yet been produced in the optical waveguides LW1 and LW3.

With appropriately rapid sampling, using the image sequences on the display or recording device, for example a printer, the temporal progression of the splice process itself can be picked up and for example utilized for purposes of optimizing this process.

For the optimal alignment of the respective fiber ends of the optical waveguides LW1 to LW4 in a multiple splice device MSE1 according to FIG. 1, using the computer unit CPU it is possible in each instance in a manner similar to FIG. 1 to generate actuating signals R1 to R4 from the difference between the reception signals RS1 to RS4 and the common theoretical value R0. Via the lines SS1 to SS4, these signals can advantageously drive four partial control elements in the multiple splice location MSE1 in a similar manner to FIG. 1.

Over and above this, these actuating signals R1 to R4 are also advantageously suitable for actuating an adjustment device JV for the optimization of the association between the light-sensitive elements LE1 to LE4 and the radiation fields SF1 to SF4 via the control lines SS1 to SS4. The adjustment device JV permits at least a displacement of the light-sensitive elements LE1 to LE4 in the lateral direction with respect to the radiation vectors VF1 to VF4. The light-sensitive elements LE1 to LE4 can in this case advantageously be directed individually or, if they are disposed on a common base GU, as shown in chain-dotted lines in FIG. 6, expediently in common.

Seen overall, in the case where the number of light-sensitive elements is equal to the number of optical waveguides to be investigated, their optical characteristic quantities can be selectively tested with particular precision.

Figure 7:
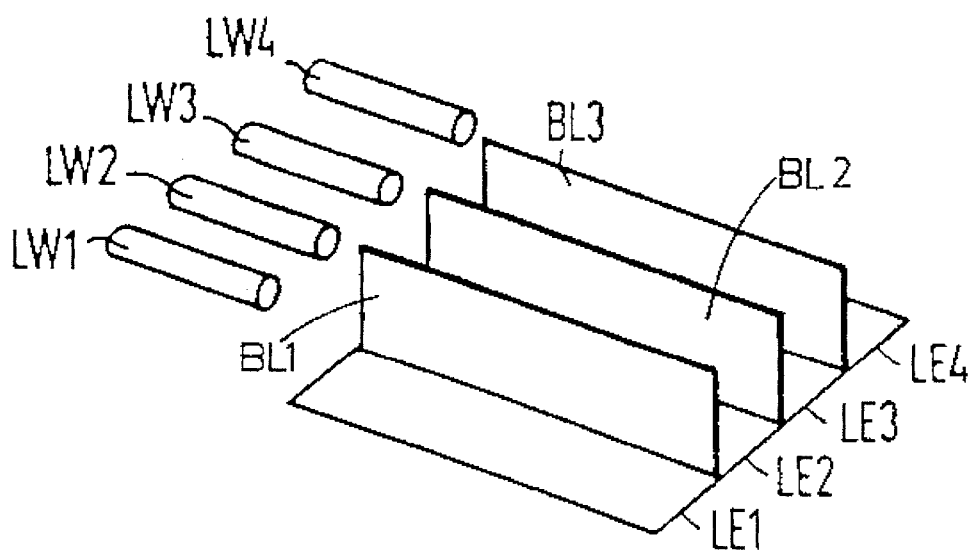
FIG. 7 shows in an enlarged, three-dimensional representation four light-sensitive elements according to FIG. 6 with three shields lying therebetween.
Figure 8:
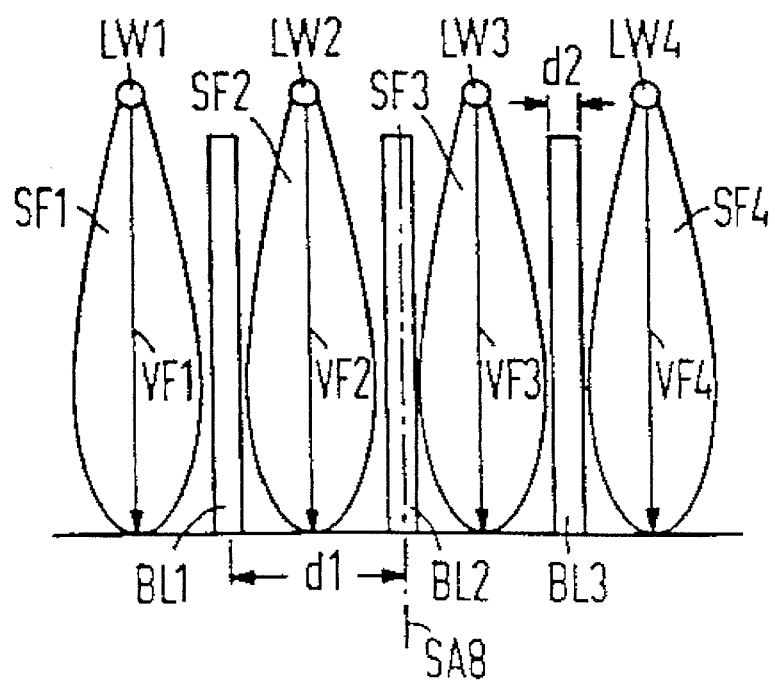
FIG. 8 shows in a diagrammatic representation of the reception conditions of four radiation fields together with four light-sensitive elements according to FIG. 6 and three shields according to FIG. 7 lying therebetween.

In FIGS. 7 and 8, shields BL1 to BL3 are inserted between the light-sensitive elements LE1 to LE4 of the optical receiver OR6 according to FIG. 6. FIG. 7 shows, on an enlarged scale, their spatial arrangement, FIG. 8 their elevation in a representation similar to FIG. 2 with the radiation fields SF1 to SF4 according to FIG. 6. Advantageously, the shields BL1 to BL3 can in this case extend counter to the direction of the radiation vectors VF1 to VF4 (in this connection, see FIG. 6) into the vicinity of the optical waveguides LW1 to LW4 in the guide groove FN6 of the cylinder ZR6. The optical waveguides LW1 to LW4 are shown broken away at the exit points of the radiation fields SF1 to SF4. The shields BL1 to BL3 extend parallel to one another and to the radiation vectors VF1 to VF4.

In order not to reduce the lateral spatial resolution of the light-sensitive elements LE1 to LE4, i.e. in a plane transverse to the principal radiative emission directions VF1 to VF4, the wall thickness d2 of the shields BL1 to BL3 is selected to be smaller than the width d1 of the light-sensitive elements LE1 to LE4 (1 mm) (in this connection, see FIG. 8), and specifically in the order of magnitude of a few μm. In this way, it is guaranteed that the shields prevent a coupling-over of adjacent radiation fields SF1 to SF4, so that their desired complete decoupling can be achieved. As a result of this, particularly precise and clear testing can be carried out.

Figure 9:
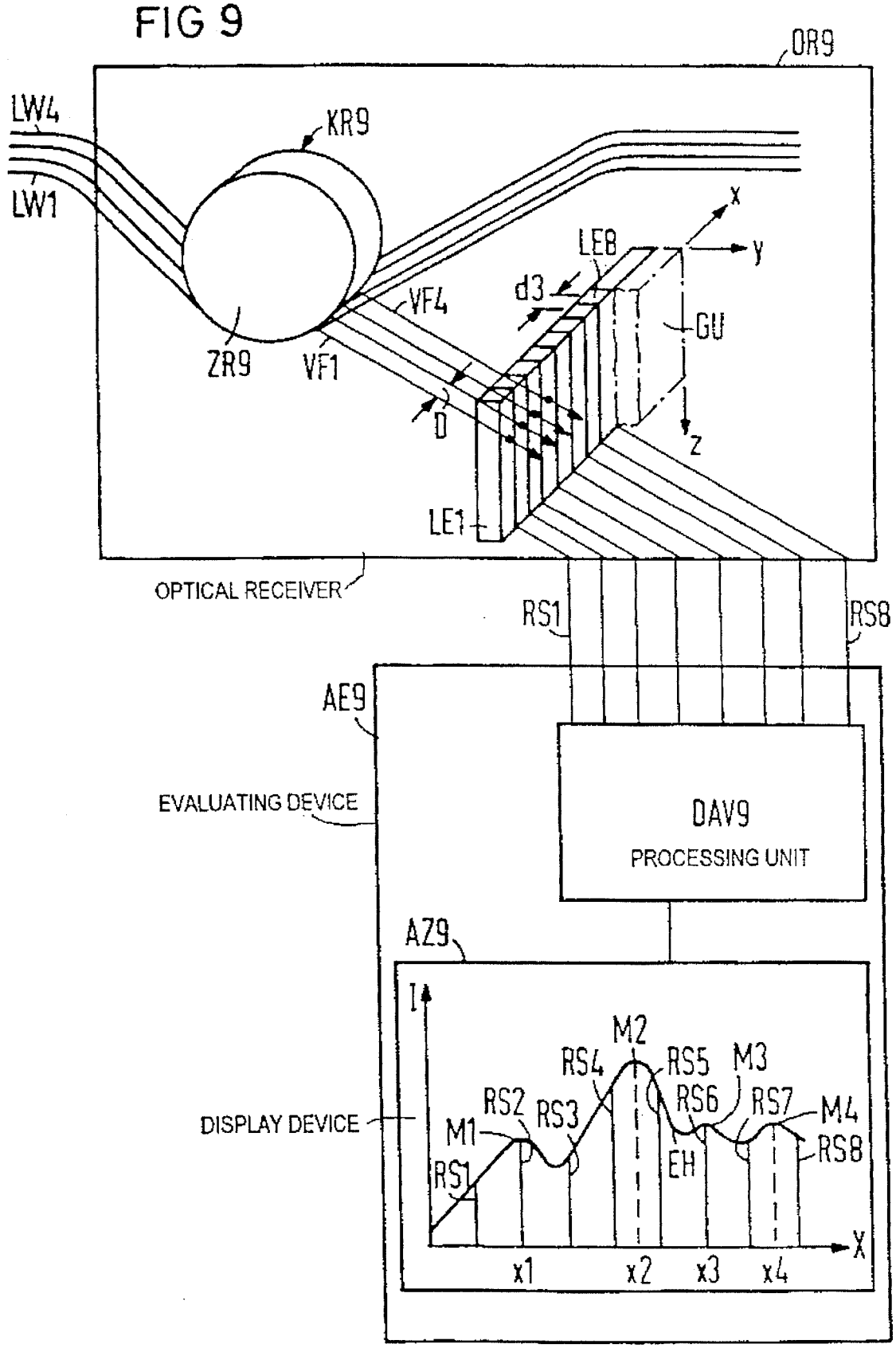
FIG. 9 shows in diagrammatic representation of a third embodiment of the test device according to the invention with four optical waveguides and eight light-sensitive elements.

FIG. 9 shows an optical reception device OR9 of a test device. Four optical waveguides LW1 to LW4 are laid, in the optical receiver OR9, around the cylinder ZR9 of the coupling device KR9 and generate four independent radiation fields SF1 to SF4, the principal radiative emission directions of which are indicated by the radiation vectors VF1 to VF4. The light intensities of these radiation fields SF1 to SF4 are received by eight light-sensitive elements LE1 to LE8 and are converted into electrical test signals RS1 to RS8. For this purpose, the light-sensitive elements LE1 to LE8 are positioned transversely to the principal radiative emission directions. Their number is greater, in a radiation region swept over by the radiation fields SF1 to SF4 to be investigated, than the number of radiation fields SF1 to SF4, so that an enhanced spatial resolution and thus an even further improved test accuracy is achieved, i.e. the spacing d3 of two center lines of adjacent light-sensitive elements LE1 to LE8 is smaller than the spacing D of two adjacent radiation vectors VF1 to VF4. For this reason, a fine adjustment between the centers of the light-sensitive elements LE1 to LE8 and the radiation vectors VF1 to VF4 indicating the principal radiative emission directions can be dispensed with. A lateral alignment of the light-sensitive elements LE1 to LE8, for example by means of an adjustment device JV according to FIG. 6, is in general not necessary for a precise testing of the optical transmission characteristic quantities.

The electrical test quantities RS1 to RS8 are fed to an evaluating device AE9, similar to FIG. 6, with components and functional units (DAV9, AZ9) similar to FIG. 1, and further processed.

In the display device AZ9, in an instantaneous recording the eight sampled spatial test values RS1 to RS8 are plotted against the lateral spatial coordinate x at the spacing d3. The continuous envelope EH of the sampled values RS1 to RS8 is indicated by means of a continuous line. This envelope EH exhibits four maxima M1 to M4, with which spatial coordinates x1 to x4 are associated. The maxima M1 to M4 correspond to the principal radiative emission directions VF1 to VF4. Although in this example it is assumed that the light-sensitive elements LE1 to LE8 are aligned neither optimally nor symmetrically in relation to the respective principal radiative emission directions VF1 to VF4, it is possible to determine by the maxima M1 to M4 of the envelope EH both the position of the radiation vectors VF1 to VF4 and their respective intensity value I.

Advantageously, a functional dependence between the sampled values RS1 to RS8 can be determined in the processing unit DAV9, for example approximately via an interlinked Gaussian algorithm or precisely in accordance with the Shannon sampling theorem, so that the envelope EH of the eight sampled values RS1 to RS8 is present in functional terms and its maxima M1 to M4 can be precisely derived.

Furthermore, in the case of a large number of light-sensitive elements LE1 to LE8, it is of advantage to apply these, for improved handling, to a common base GU, which is represented in chain-dotted lines in the right-hand half of the illustration of FIG. 9. The light-sensitive elements LE1 to LE8 can expediently be disposed on this base in a line structure or in an array structure.

Particularly favorable properties with respect to the evaluation and readout possibilities for the electrical test signals RS1 to RS8 are exhibited not only by the customary diodes but also principally by light-sensitive elements LE1 to LE8 with an internal charge amplifier or so called CCD elements. The latter offer the advantage that their memory values are particularly favorable for an A/D conversion, so that the test signals RS1 to RS8 can be evaluated directly in a digital computer system or in a digital image-generating system (CCD camera, image processing). Over and above this, using this measure, above all the handling of a very large number of light-sensitive elements is facilitated. Advantageously suitable are lines with 10 to 2000 elements or arrays with 10 to 2000 times 10 to 2000 elements (video standard). By way of example, photodiodes and CCD arrays of the company EG & G Reticon (USA) are suitable.

The embodiments shown in FIGS. 1 to 9 and the statements made in relation thereto relate, for better illustration, in each instance to a specific number of optical waveguides and light-sensitive elements. However, they are transferable without restriction to arbitrarily many, i.e. n optical waveguides and m light-sensitive elements.

In the most favorable case, for a precise selective testing according to FIG. 9 the number m of light-sensitive elements is to be selected to be at least five times as great as the number n of optical waveguides. Expediently, the number m of light-sensitive elements is selected to be between 10 and 200 times (preferably approximately 100 times) as great as the number n of optical waveguides.

In the event that, in a similar way to FIG. 3, m<n is selected, for m at least m≧2 must be applicable. In this case, additionally for m the following should be applicable: m=k·n, where k is to be selected to be at least 0.3, expediently between 0.5 and up to 1.0.

In the case of the coupling-out and reception of radiation fields of a plurality of optical waveguides to be tested, by means of light-sensitive elements, there may possibly be mutual coupling-over of adjacent radiation lobes, so that an evaluation of the radiation fields and their coupling conditions can be impaired.

Accordingly, the object of a further development of the invention is to indicate a way of being able to improve the coupling conditions for testings on a plurality of optical waveguides in a simple manner. This object is achieved in that between coupling-out positions of the optical waveguides and the light-sensitive elements there are provided means which effect an enhanced decoupling of adjacent radiation fields.

This further development of the invention is especially distinguished in that the possibilities for the selective reception as well as for separate evaluation of the radiation fields of a plurality of optical waveguides are improved or optimized. As a result of the fact that means for the enhanced decoupling of adjacent radiation fields, such as for example optical imaging means, holograms, Bragg cell, etc., are disposed between the coupling-out positions of the optical waveguides and the light-sensitive elements, the selective reception of the radiation fields is optimized, i.e. their radiation lobes are picked up in a manner which is to a large extent decoupled from one another by the light-sensitive elements. By these means, the radiation fields or their light components are transformed so that they fall separately or with separation from one another onto the light-sensitive elements, in which case a disturbance or interaction between adjacent radiation lobes is avoided to a large extent. On account of the improved decoupling, the radiation fields emerging individually from the optical waveguides to be tested, at their coupling-out positions, can thus be transmitted or imaged in a manner which is to a large extent of low loss, onto the light-sensitive elements, so that their separate evaluation is enabled there.

According to an expedient further development of the invention, the radiation fields exhibit, transversely to the connecting line of the optical waveguides, in each instance a greater spread than along their connecting line. As a result of the fact that the radiation fields are imaged so that they exhibit perpendicularly to their direction of propagation a greater spatial spread than in the direction of the connecting line of the optical waveguides, i.e. along the straight line connection of their coupling-out positions, advantageously it is ensured that the radiation fields are imaged in a manner decoupled from one another onto the light-sensitive elements. This ensures a selective, individual evaluation of the respective radiation field light components for each individual optical waveguide to be tested, to a large extent uninfluenced by disturbances of adjacent radiation fields. As means for the selective, decoupled imaging of the radiation fields there are advantageously suitable optical imaging means such as, for example, coupling-out optical systems, in particular a lens system which includes for example a monochromatically corrected triplet. Furthermore, the radiation fields can advantageously be imaged or transformed for example also with the aid of a phase hologram or for example with the aid of a Bragg cell onto the light-sensitive elements with enhanced decoupling.

A further development of the invention also relates to a method, using a test device of the initially mentioned type, which is characterized in that the radiation fields are imaged with enhanced mutual decoupling onto the light-sensitive elements.

A further development of the invention also relates to a device for testings on a plurality of optical waveguides, in particular according to the first test device according to the invention, which device is characterized in that the optical receiver is designed in such a manner that at least one light-sensitive element is disposed to be displaceable relative to the optical waveguides to be tested, transversely to the direction of propagation of the radiation fields.

As a result of the fact that at least one light-sensitive element is disposed to be displaceable at least once relative to the optical waveguides to be tested, transversely to the direction of propagation of the radiation fields, it is to a large extent ensured that radiation fields which emerge from the optical waveguides to be tested, in each instance at their coupling-out positions along their sections of curvature, are picked up in temporal succession as well as selectively by at least one light-sensitive element. As a result of the relative movement of the light-sensitive element, in each instance a separate recording of the radiation field of each optical waveguide to be tested is to a large extent enabled individually as well as in a manner decoupled from adjacent radiation fields. From the temporal progression of the recorded intensity distributions, detailed information can be obtained individually for each optical waveguide, e.g. on its condition, its spatial position (spatial intensity distribution), its attenuation behavior, etc., and thus can be selectively prepared for further evaluation for various practical applications.

A further development of the invention relates to a further device for testings on a plurality of optical waveguides, in particular according to the first and/or the second test device according to the invention, which is characterized in that the optical receiver is designed in such a manner that its coupling device with the optical waveguides to be tested is disposed to be displaceable relative to at least one light-sensitive element, transversely to the direction of propagation of the radiation fields.

Figure 10:
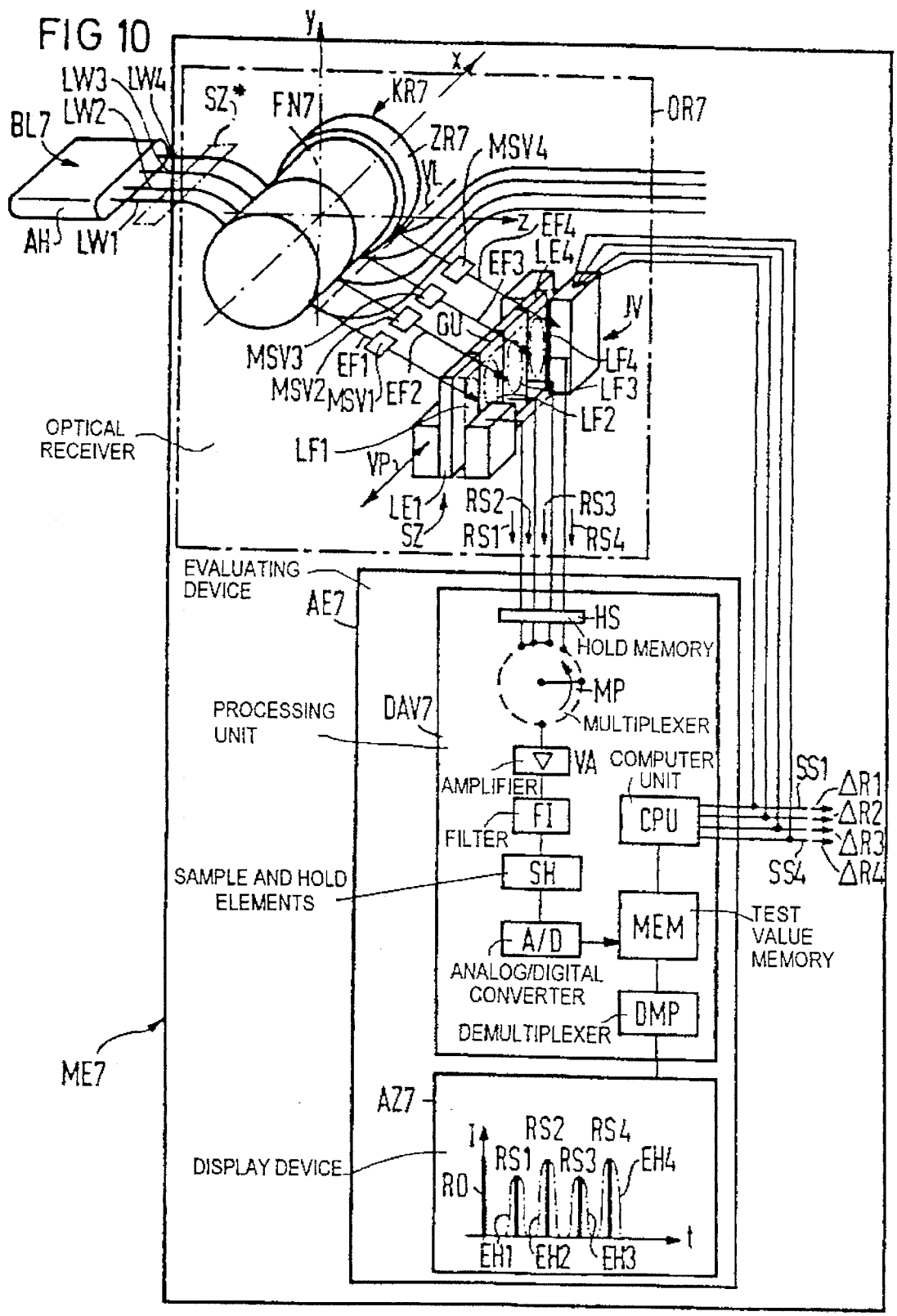
FIG. 10 shows in a diagrammatic representation of the test device according to FIG. 6 with four optical waveguides and four light-sensitive elements with decoupling means disposed therebetween.

FIG. 10 diagrammatically shows a test device ME7 according to the invention, having an optical receiver OR7 as well as a test device AE7. The optical receiver OR7 is coupled to a plurality of optical waveguides at the same time, e.g. to four optical waveguides LW1–LW4, with the aid of a coupling device KR7. The four optical waveguides LW1–LW4 are combined in FIG. 10 into a group, for example in the form of an optical waveguide band or of a strip line BL7, and are mechanically fixed approximately parallel alongside one another by their outer sheathing AH. The outer sheathing AH of the strip line BL7 is indicated in the left-hand part of FIG. 10 and has been omitted in the remaining part of the figure for the sake of clarity.

Light signals, such as for example test light signals specifically coupled in on the emission side or alternatively message signals, are passed into the optical waveguide LW1–LW4. The coupling-in of the light signals can expediently take place for example according to the flexural coupler principle or directly via the open end faces of the optical waveguides LW1–LW4.

The group including the four optical waveguides LW1–LW4, in particular the strip line BL7 with the preferably transparent outer sheathing AH, is laid on the reception side in the coupling device KR7 of the optical receiver OR1 preferably around a for example approximately cylindrical flexing beam ZR7, curved in its guide groove FN7. As a result of this, in each instance components of the light signals guided in the optical waveguides LW1–LW4 are coupled out along the respective optical waveguide curvature section at coupling-out positions according to the flexural coupler principle, i.e. four radiation fields EF1–EF4 emerge approximately tangentially as reception radiation fields from the four optical waveguides LW1–LW4 to be tested, at coupling-out positions along their curvatures. The coupling-out positions lie in this case in the region of the optical waveguide curvatures approximately on a connecting line VL, which is indicated by chain-dotted lines in FIG. 10 and extends approximately transversely to the radiative emission direction of the radiation fields EF1–EF4. In FIG. 10, the four radiation fields EF1–EF4 are represented with respect to their principal radiative emission directions or directions of propagation, by four individually associated radiation vectors.

Between the coupling-out positions for the radiation fields EF1–EF4 along the optical waveguide curvature sections and a test or sensor line SZ, which is positioned approximately transversely to the direction of propagation of the four radiation fields EF1–EF4, there are provided means MSV1–MSV4, which effect an enhanced decoupling of adjacent radiation fields, e.g. for EF1 and EF2. These means MSV1–MSV4 are individually associated with the radiation fields EF1–EF4 or their radiation paths. This is symbolically indicated in FIG. 10 by means of small boxes with the designations MSV1–MSV4, which are disposed in each instance transversely to the principal radiative emission directions of the radiation fields EF1–EF4, e.g. in a sequence. The interposed means MSV1–MSV4 ensure that a mutual coupling-over of radiation lobes of adjacent radiation fields, e.g. of EF1 and EF2, is to a large extent avoided. By the means MSV1–MSV4, the radiation fields EF1–EF4 proceeding from their coupling-out positions are transmitted to the test line SZ separately or with separation from one another, i.e. selectively; in this case, a disturbance or interaction of adjacent radiation lobes is to a large extent avoided. The means MSV1–MSV4 thus transform or form in each instance the radiation fields EF1–EF4 emerging at the coupling-out positions on their transmission path to the test line SZ individually in such a manner that they are present there in the region of the test line with improved decoupling relative to one another and are accessible to a separate or selective evaluation. In the ideal case, these are the surfaces of the cores of the optical waveguides or their emerging close fields.

In FIG. 10, the test line SZ is constructed with four light-sensitive elements LE1–LE4 set up alongside one another. The means MSV1–MSV4 act on the radiation fields EF1–EF4 in such a manner that these are incident in the region of the four light-sensitive elements LE1–LE4 with four separately associated light spots LF1–LF4. In this case, the light spots or illuminated spots LF1–LF4 are clearly associated with the light-sensitive elements LE1-LE4. The light spots or illuminated spots LF1–LF4 are indicated, for illustrative purposes, on the light-sensitive elements LE1–LE4 associated with them, diagrammatically by means of chain-dotted, oval or elliptical framings.

Figure 13:
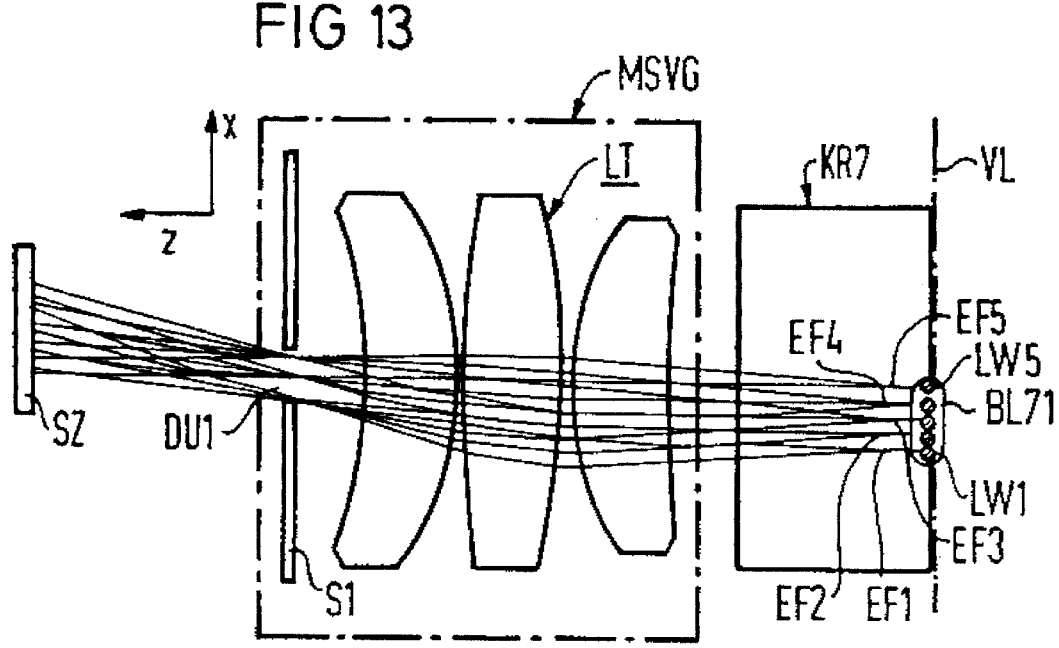
FIG. 13 shows in a diagrammatic representation of an embodiment for the improved decoupling of adjacent radiation fields with the aid of optical imaging means in a coupling-out plane of the test device according to FIG. 10
Figure 14:
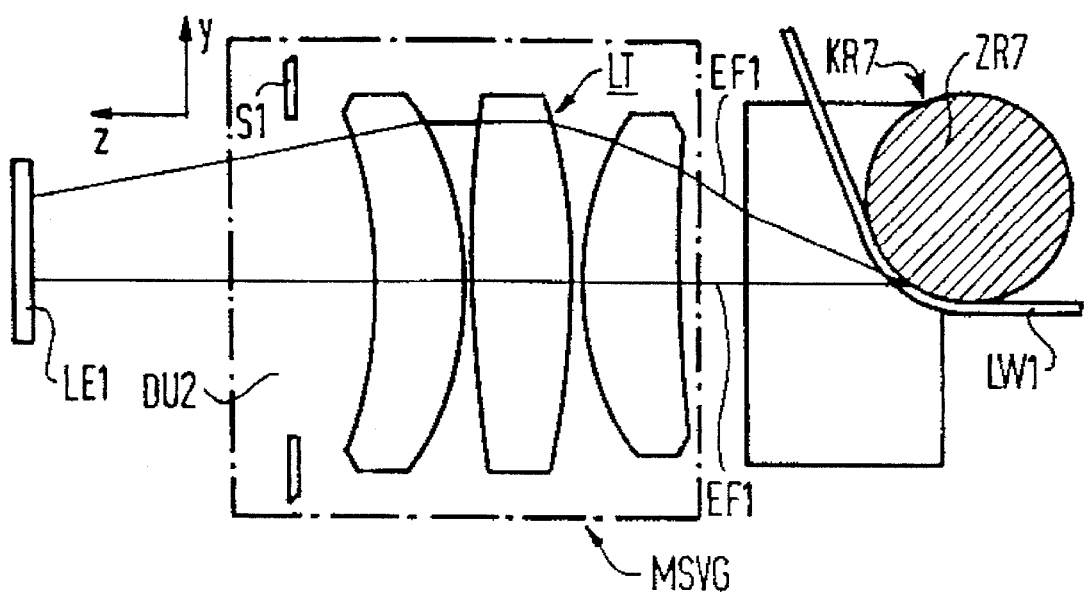
FIG. 14 shows in an diagrammatic representation of the optical imaging means in an elevation perpendicular to the plane of the drawing of FIG. 13.

As means MSV1–MSV4 for the improved decoupled imaging of the radiation fields there may be provided for example optical imaging means, as shown in FIGS. 13 and 14. Furthermore, the radiation fields EF1–EF4 can advantageously also be imaged or transformed by means of phase holograms or for example by means of a Bragg cell onto the light-sensitive elements LE1–LE4 with enhanced decoupling. Further details concerning the imaging of the radiation fields EF1–EF4 by means of optical imaging means are shown in FIGS. 13 and 14.

In this way, the radiation fields EF1–EF4 together with their associated light spots LF1–LF4 are selectively picked up by the light-sensitive elements LE1–LE4. Their reception characteristics are clearly associated in each instance with the radiation fields EF1–EF4, and aligned in each instance with respect to these so that at least in all cases the principal component of the respective radiation field can be received. The optical power of the radiation fields EF1–EF4 is converted in each instance by the light-sensitive elements LE1–LE4 into the electrical test signals RS1–RS4.

In the case of a discrete or digital signal evaluation, these are stored in a hold memory HS of a readout and processing unit DAV7 of the evaluating device AE7, at least for four clock periods of a downstream multiplexer MP. The multiplexer MP reads out the individual test signals RS1–RS4 in 4 clock periods in succession in time one after the other, from the hold memory HS. Subsequently, the continuous test signals RS1–RS4 are passed serially via an amplifier VA and are freed from extraneous signals with the aid of a filter FI. The continuous test signals RS1–RS4 are discretized for example by means of a sample and hold element SH and an analog/digital converter A/D and filed in a test value memory MEM. In the case of an analog signal evaluation, the continuous test signals RS1–RS4 are expediently filed directly in the test value memory MEM. The further signal processing of the test signals RS1–RS4 is undertaken by a computer unit CPU, which if required functionally links with one another the recorded test signals RS1–RS4, so that for each optical waveguide LW1–LW4 the pertinent test quantities are selectively determinable. For the visual assessment of the optical test quantities, e.g. of the splice attenuations, the spatial distribution of the optical waveguides to be tested, the phase transit time, the optical waveguide identification etc., these are read out from the test value memory MEM and are fed, in the case of discrete processing, via a demultiplexer DMP to a display device AZ7.

For digital signal evaluation, the discrete time-division multiplex test signals RS1–RS4 are imaged in common in the display device AZ7. The progressive instantaneous recording shows the temporal intensity progression I of the four test signals RS1–RS4 as a function of the time t. These test values RS1–RS4 describe in each instance the integral sum of the quantity of light of the coupled-out radiation fields EF1–EF4 which is picked up by the light-sensitive elements LE1–LE4. The two test values RS1 and RS3 lie below the test values RS2 and RS4, i.e. in the case of the light-sensitive elements LE1 and LE3 a smaller conducted quantity of light is tested in the optical waveguides LW1 and LW3. Accordingly, a test value RS1–RS4 is precisely associated with each optical waveguide LW1–LW4, since in the coupling-out region the corresponding number of light-sensitive elements LE1–LE4 is clearly associated with the four optical waveguides LW1–LW4 to be tested.

In the case where the number of light-sensitive elements is selected to be larger than the number of optical waveguides to be tested, i.e. more than four light-sensitive elements are provided in the test line SZ, there are further, additional test values with pertinent chain-dotted, selective envelopes EH1–EH4, as indicated in the display device AZ7 for the ideal case of a continuous test signal recording. In other words, this means that in addition to the four discrete test values RS1–RS4 additional, further discrete test values are added under the envelopes EH1–EH4 lying separately alongside one another, in which case the number of sampled test values then corresponds to the number of light-sensitive elements. A precise, clear alignment or association of the radiation fields (or of the optical waveguides to be tested) with respect to the light-sensitive elements of the test line SZ can then advantageously be dispensed with.

With the aid of the computing unit CPU, a wide variety of information concerning the optical waveguides LW1 to LW4 can advantageously be obtained from the selectively recorded reception signals RS1–RS4, such as for example information concerning their position, their condition, their number, their optical characteristic quantities, such as transmission attenuations, phase transit times, etc.

In FIG. 10, actuating signals ΔR1–ΔR4 are obtained for example from the recorded reception signals RS1–RS4, with the aid of which actuating signals an adjustment or movement device JV is actuated via lines SS1–SS4 for the displacement of the light-sensitive elements LE1–LE4 of the test line SZ. The movement device JV permits a displacement of the light-sensitive elements LE1–LE4 of the test line SZ in the lateral direction, i.e. transversely to the direction of propagation of the radiation fields EF1–EF4, preferably in the manner of a "jitter" movement. The relative movement is indicated by a displacement arrow VP. The test line SZ is thus advantageously disposed to be displaceable at least once to and fro relative to the radiation fields EF1–EF4 transversely to their directions of propagation. As a result of the preferably continuous or stepwise movement of the test line SZ past the radiation fields EF1–EF4, it is possible to obtain a temporal intensity test value recording of the radiation fields EF1–EF4, i.e. the radiation fields EF1–EF4 are sampled with higher temporal resolution and thus higher spatial resolution and are thus likewise available for evaluation in a form decoupled from one another. The radiation fields EF1–EF4 are thus scanned or covered in the manner of a camera, e.g. "quasi continuously" or in discrete sampling steps, by the individual light-sensitive elements LE1–LE4 of the test line SZ. Thus, for each individual radiation field there is selectively available a multiplicity of test information due to the improved spatial resolution. The light-sensitive elements LE1–LE4 can in this case advantageously by disposed individually or on a common base GU, as shown in chain-dotted lines in FIG. 10. If required, the light-sensitive elements can also be disposed in the form of a test field or test array. Advantageously, the optical receiver OR7 can also be designed in such a manner that in place of the test line SZ its coupling device KR7 with the optical waveguides LW1–LW4 to be tested is disposed to be displaceable relative to the test line SZ transversely to the direction of propagation of the radiation fields EF1–EF4. The radiation fields EF1–EF4 are thus picked up by the light-sensitive elements in a manner sharply separated from one another and correspondingly represented in the display device AZ7.

For a selective, individual recording of the radiation fields EF1–EF4, it can just be sufficient, on account of the displacement movement, to provide one light-sensitive element in the coupling region of the coupling device KR7. If only one light-sensitive element is fitted displaceably in the adjustment or movement device JV, then this element expediently exhibits, for the selective radiation field recording, a spread transversely to the principal radiative emission direction of the radiation fields EF1–EF4 which approximately corresponds to one half of the respective width of the radiation field. With the aid of the displacement movement of at least one light-sensitive element, it is thus possible for example to obtain the same test results as with a high-resolution test line SZ, i.e. a very large number of light-sensitive elements; in this case, their number is in particular greater than the number of optical waveguides. As a result of the displacement movement of the test line SZ with at least one light-sensitive element, radiation fields which are to a large extent decoupled from one another are thus again available for evaluation.

If required, the reception-side coupling device according to the flexural coupler principle can also be imp lamented by other coupling devices. Thus, for example, the reception-side coupling device can also be formed by the light-sensitive elements LE1 - LE4 coupled directly to the ends of the optical waveguides LW1–LW4. In the coupling device KR7 of the optical receiver OR7, the flexing beam or the flexural coupler ZR7 is then omitted, so that the test line SZ, if required together with preceding decoupling means MSV1–MSV4, is disposed directly at the end-face open ends of the optical waveguides LW1–LW4, transversely to their longitudinal axis. This further possibility of coupling on for the test line SZ is indicated by a chain-dotted line box with the reference symbol SZ*, which is shown in the immediate vicinity (output) of the open end face of the optical waveguide band BL7. The side by side sequenced light-sensitive elements LE1–LE4 of the test line SZ* disposed there are expediently positioned with respect to their reception characteristics transversely to the reception radiation fields EF1–EF4 coupled out from the open end faces of the optical waveguides LW1–LW4 in such a manner that these are imaged directly or possibly with interposition of the decoupling means MSV1–MSV4, to a large extent selectively, onto the light-sensitive elements LE1–LE4. The coupling device, disposed at the end side, in the form of the test line SZ* is expedient in particular in the case of path attenuation testing, where the ends of the optical waveguides are freely accessible.

In place of testings on the optical waveguide band BL7 with the optical waveguides LW1–LW4 which lie approximately parallel alongside one another, i.e. which are disposed in a to a large extent structured fashion, with the aid of the test device ME7, in particular in the case of end-face or end-side arrangement of the test line (SZ*), testings can also be undertaken for example on a bundle or a group including optical waveguides. The optical waveguides can in this case also lie in an unordered structure in relation to one another, as long as the selective reception of their radiation fields is to a large extent assured. The optical receiver OR7 is then suitable especially in the case of end-side coupling on of the reception-side coupling device of the light-sensitive elements LE1–LE4 (without the coupling out of light according to the flexural coupler principle) for optical waveguide identification. Thus, by way of example, the number of optical waveguides in the group or the bundle, the condition, the optical characteristic quantities (such as for example attenuation, phase transit times, impulse responses, . . . ) of the optical waveguides selectively, the spatial position of each individual optical waveguide or the spatial distribution of the optical waveguides in total, etc. can be determined in a simple manner and made available for further evaluation. Advantageously, in the case of a group or bundle including unordered optical waveguides, the light-sensitive elements are then disposed in the form of a plurality of test lines, staggered one above the other (laminar array).

If the light-sensitive elements within the laminar array are designed to be of very high resolution (i.e. of small area), then in the final result a high-resolution image for example of the optical waveguide distribution within a cable bundle can be obtained. To this end, it is expedient if in each instance the size of the individual light-sensitive elements within the array (test field) in the x and y direction is selected in the order of magnitude of the light spot impinging on it. Expediently, in each instance the active area of an individual light-sensitive element is selected to be approximately equal to the area of the impinging light spot. For even higher resolutions, the active area of an individual light-sensitive element (reception element) is to be selected to be smaller than the area of the impinging light spot.

Figure 11:
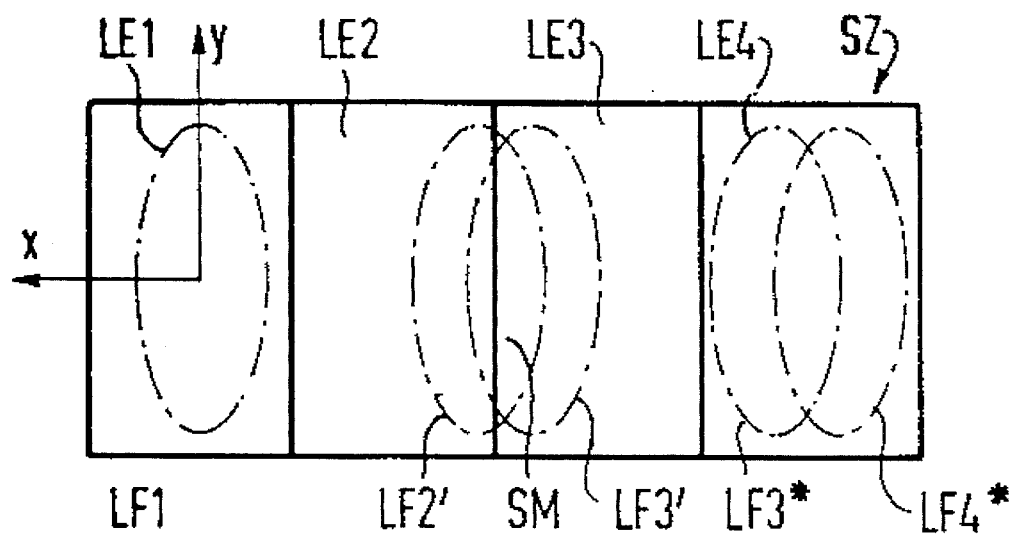
FIG. 11 shows in a diagrammatic representation of the reception conditions in the case of a test line with four light-sensitive elements according to FIG. 10.

In FIG. 11, in order to illustrate the coupling conditions, the four light-sensitive elements LE1–LE4 of the test line SZ of FIG. 10 are shown together with radiation fields in a reception plane x, y (see FIG. 10) transversely to the direction of propagation of the radiation fields EF1–EF4. FIG. 11 illustrates how the means MSV1–MSV4 act in order that the radiation fields EF1–EF4 or their light spots LF1–LF4 can be picked up by the test line SZ with optimized, i.e. improved decoupling.

By way of example, the light spot or illuminated spot LF1 associated with the radiation field EF1 falls only onto the light-sensitive element LE1 and fills the major part of its active area with its preferably approximately elliptical or oval or for example also strip-shaped form. In this way, it is to a large extent ensured that the radiation field EF1, which is coupled out from the optical waveguide LW1, is transformed with the lowest possible loss by the means MSV1 onto the light-sensitive element LE1 and is as completely as possible picked up by the latter. In the region of the test line SZ, the radiation field EF1 is thus incident in a form decoupled or separated from the remaining radiation fields EF2–EF4. The coupling conditions for the radiation field EF1 are thus to a large extent ideal or optimal. In order to achieve this, the form of the radiation field EF1 or its associated light spot LF1 is as far as possible adapted to the spatial spread of the light-sensitive element EF1.

Preferably, the radiation fields EF1–EF4 in FIG. 11 exhibit, for their optimized decoupling transversely to the connecting line VL of the optical waveguides LW1–LW4, i.e. transversely to the direction of propagation of the radiation fields EF1–EF4, in each instance a greater spread than along the connecting line VL of the optical waveguides LW1–LW4, in order to utilize as completely as possible the light-sensitive elements LE1–LE4 which are in this case, in FIG. 11, approximately strip-shaped. The means MSV1–MSV4, which are provided between the coupling-out positions of the radiation fields EF1–EF4 and the associated light-sensitive elements LE1–LE4 thus bring about an enlargement of the spread, in particular a broadening in the y direction by at least the factor 2, of the radiation fields EF1–EF4 transversely to the connecting line of the optical waveguides LW1–LW4 in the optical waveguide band BL7 and/or a narrowing of the radiation fields EF1–EF4 in the region of the light-sensitive elements LE1–LE4 along the connecting line of the optical waveguides LW1–LW4. Advantageously, the spread of the radiation fields (e.g. EF1 and EF2) in the direction of the connecting line VL of the optical waveguides LW1–LW4 is selected to be so small that in each in-stance in the region of the reception elements LE1–LE4 adjacent illuminated spots (e.g. LF1, LF2) do not overlap or overlap as little as possible. Advantageously, the light spots or illuminated spots LF1–LF4 formed in each instance by the radiation fields EF1–EF4 in the region of the light-sensitive elements LE1–LE4, transversely to the connecting line VL of the optical waveguides are thus larger, in particular at least twice as large as along the connecting-line VL of the optical waveguides LW1–LW4. It can also be expedient to impart to the light spots LF1–LF4 of the radiation fields EF1–EF4 in the region of the test line SZ, with the aid of the interposed means MSV1–MSV4, in each instance a strip form or line form, so that they optimally illuminate, separately from one another, the light-sensitive elements LE1–LE4, which are for example in this case in FIG. 11 approximately strip-shaped. As a result of this particular shaping of the light spots LF1–LF4 which is adapted to the light-sensitive elements, in particular with optical imaging means as are represented in FIGS. 13 and 14, an improved, i.e. optimized decoupling of the radiation fields EF1–EF4 and thus an improved, selective evaluation are achieved in a simple manner.

In FIG. 11, besides the imaging or transformation of the light spot LF1 which is to a large extent optimal for the radiation field EF1, two cases are also represented in which the coupling conditions and thus the evaluation for the radiation fields EF2–EF4 are made more difficult. Thus, for example, the radiation field EF2 impinges by its illuminated spot LF2', both on the light-sensitive element LE2 and also on the light-sensitive element LE3. Likewise, the radiation field EF3 with its light spot LF3' is picked up at the same time by the light-sensitive element LE2 and by the light-sensitive element LE3, so that there is a superposition of the two illuminated spots LF2' and LF3' in a region SM. A selective evaluation of the light spots LF2' and LF3' is thus possible only approximately or with difficulty on account of their superposition in the region SM.

Impairments of the coupling or reception conditions can also arise if the light spots, in the case of a rigid association of the radiation fields EF1–EF4 with the light-sensitive elements LE1–LE4, are imaged onto a common light-sensitive element. Onto the light-sensitive element LE4 of FIG. 11 there fall, for example, the radiation fields EF3 and EF4 with their light spots LF3* and LF4* in common, so that their selective or separate evaluation is impaired. Nevertheless, a remedy is possible for the two problem cases, last mentioned by way of example, of coupling over of adjacent radiation fields, in that the light-sensitive elements LE1–LE4 are displaced to and/or fro at least once transversely to the radiative emission direction of the radiation fields EF1–EF4, so that a temporal and thus also a spatial resolution of the radiation fields EF1–EF4 can be achieved, i.e. the radiation fields EF1–EF4 are to a large extent decoupled from one another.

Figure 12:
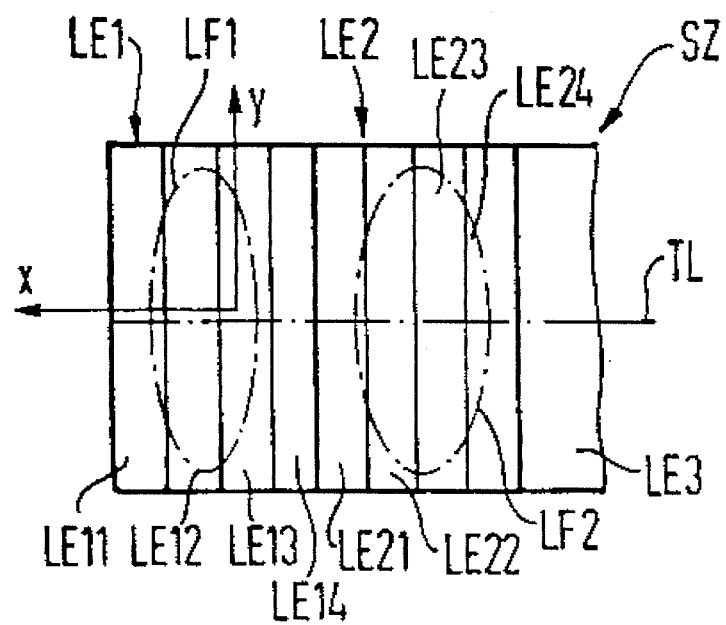
FIG. 12 shows in a diagrammatic representation of the reception conditions in the case of a test line modified in relation to FIG. 11.

In FIG. 12, four test cells are in each instance individually associated with the radiation fields EF1–EF4 or their associated light spots LF1–LF4. In other words, this means that in each instance four individual, active areas for light reception are associated with each optical waveguide LW1–LW4 to be tested. By way of example, the light-sensitive element LE1 is thus once again subdivided into four for example strip-shaped cells LE11, LE12, LE13 and LE14. The remaining light-sensitive elements LE2–LE4 are designed in similar fashion. Thus, the light spot impinges, in a coupling-out or reception plane x, y, i.e. in a plane perpendicular to the direction of propagation of the radiation field EF1, on four test cells LE11–LE14, so that a refined or more highly spatially resolved light reception is obtained for the light spot LF1. Corresponding coupling conditions also arise for the light spot LF2 (and the remaining light spots LF3 and LF4), which is picked up, decoupled from the adjacent light spots LF1 and LF3, by four specifically associated cells LE21 LE24 in the light-sensitive element LE2.

In place of the test line SZ, advantageously a test field or test array can also be provided. This is indicated by way of example by the subdivision of the test line SZ by a line of separation TL transversely to the strip-shaped cells LE11–LE14, LE21–LE24, . . . LE41–LE44. Advantageously, test lines with 10 to 2000 elements or arrays with 10 to 2000 times 10 to 2000 elements are suitable.

The embodiments shown in FIGS. 10 to 12 and the statements made in relation thereto relate, for better illustration, to a specific number of optical waveguides and light-sensitive elements (4 light-sensitive elements, 4 optical waveguides). However, they are transferable without restriction to arbitrarily many, i.e. n optical waveguides and m light-sensitive elements.

FIGS. 13 and 14 show, in diagrammatic representation, by way of example as means for the improved decoupling of adjacent radiation fields, an optical imaging means or a coupling-out optical system MSVG, which includes in particular a three-element lens system LT with a downstream slot diaphragm S1. In FIG. 13, the coupling-out optical system MSVG is diagrammatically represented in a coupling-out plane x, z, in which the radiation vectors of the radiation fields lie approximately parallel alongside one another, in which case the direction of propagation of the radiation fields points in the direction of the z axis. FIG. 13 thus represents approximately a plan view of the coupling conditions in the optical receiver OR7 of FIG. 10.

By way of example, five optical waveguides LW1–LW5 are now inserted into the coupling device KR7 in the form of a strip line BL71. Five radiation fields EF1–EF5 emerge from the optical waveguides LW1–LW5 at coupling-out positions along the respective optical waveguide curvature sections. The radiation fields EF1–EF4 are imaged by the coupling-out optical system MSVG, decoupled from one another, onto the test line SZ. In this case, the radiation fields EF1–EF5 are expediently optically enlarged by the coupling-out optical system MSVG, preferably by the factor 3.5 (calculated from the connecting line VL of the optical waveguides LW1–LW5 to the test line SZ), in order to be able to image them in a manner adapted as far as possible to the sensor elements of the test line SZ, onto these sensor elements. For decoupling, the optical shaping for the radiation fields EF1–EF5 takes place in such a manner that for example in each instance at least four cells of a light-sensitive element of the test line SZ (in a similar way to FIG. 12) pick up in each instance one radiation field. In this way, advantageously the intensity values of the radiation fields EF1–EF5 of more strongly radiating adjacent optical waveguides can be arithmetically extracted as against those of more highly attenuated optical waveguides. Expediently, to this end, in each instance the core radiation region of the optical waveguides LW1–LW5 is imaged onto the test line SZ or possibly onto an array.

The arrangement of the coupling-out optical system MSVG in the cross sectional plane of the optical waveguide band BL71 is shown in FIG. 13. The test line SZ or possibly also a sensor array is situated in the left-hand half of the illustration. Expediently, the light rays of the radiation fields EF1–EF5 are imaged by the coupling-out optical system MSVG telecentrically, i.e. they do not pass through its optical axis. In the first instance, the radiation fields EF1–EF5 pass through the three-element lens system LT, downstream of which the slot diaphragm S1 is disposed. The lens system LT expediently includes a monochromatically corrected triplet of high-refractive-index heavy flint glass. This triplet preferably has, in the test spectral range around 800 nm, a good transmission, flat radii for low wave aberrations and a low residual reflection.

As a result of the slot diaphragm S1 disposed downstream of the lens system LT, it is achieved that the differing apertures and radiation angles of the radiation lobes of the radiation fields EF1–EF5 are optimally coordinated with the geometry of the sensor elements or light-sensitive elements of the test line SZ or possibly of the array and thus the maximum possible optical power is coupled into its test cells.

By way of example, a line sensor SZ with 256 elements of a spatial spread of approximately 50 µm×2.5 mm pixel size is selected as test line SZ in the left-hand half of the illustration of FIG. 13. The length of the test line SZ is then approximately 12.8 mm. With a desired magnification of 3.5, the object region then imaged by the coupling-out optical system MSVG is approximately 3.66 mm wide. The optical waveguide band BL71 with for example a width of approximately 3.2 mm is situated in this object region. In the coupling-out plane x, z, the radiative emission angle of the radiation fields EF1–EF5 is small, corresponding to the optical waveguide aperture of approximately 0.1. The coupling-out optical system MSVG is then adapted to the coupling conditions for this specific example of computation or embodiment in such a manner that the radiation distributions of the individual optical waveguides LW1–LW5 fall, separated from one another or spread out, onto the sensor elements which have a width of approximately 50 µm in this cross sectional illustration. Since the radiative emission cones or radiation lobes of the optical waveguides LW1–LW5 have approximately the same direction (parallel to the optical axis of the system), the coupling-out optical system MSVG advantageously images the radiation fields EF1–EF5 telecentrically.

Furthermore, the slot diaphragm S1 ensures a telecentric radiation path of the radiation fields EF1 EF5 which is adapted to the respective embodiment. Expediently the transmission opening DU1 of the slot diaphragm S1 is selected in such a manner that a predeterminable aperture can be set for the three-element lens system LI. In this embodiment, the imaging optical system MSVG in particular the slot diaphragm S1 with its opening DU1 is adapted to the specific coupling conditions in such a manner that in the coupling-out plane x, z a low aberration with a scatter circle diameter preferably smaller than 70 µm on the sensor line SZ and a spatial resolution in the vicinity of the sansor spatial frequency are obtained. In addition, the slot diaphragm S1 performs in this coupling-out plane x, z a spatial filtering of the radiation fields EF1–EF5 and thus their "focusing" or the removal of their edge distortions.

FIG. 14 shows the coupling-out optical system MSVG in a coupling-out or cross sectional plane Y, z perpendicular to the plane of the drawing of FIG. 13. In this cross sectional plane, by way of example the beam path of the radiation field EF1 is shown proceeding from the optical waveguide LW1. Expediently in this case, the beam path of the radiation field EF1 passes through the optical axis of the coupling-out optical system MSVG centrally, in order to be able to image the relatively large aperture of the optical waveguide LW1 in the y direction, i.e. perpendicular to the direction of propagation of the radiation field EF1, onto a sensor element. The radiative emission angle is thus relatively large in this coupling-out or flexural plane y, z. The coupling-out optical system MSVG is accordingly expediently designed for the reception of radiation within a relatively large angular range of at least ±20° preferably ±35° and, as a maximum, ±45°. In this plane Y, z, a length of 2.5 mm is expediently selected for the sensor elements of the test line SZ. The coupling-out optical system MSVG with the lens system LT and the slot diaphragm S1 with its transmission opening DU2 is advantageously adapted to the given conditions so that a scatter circle diameter of at most 2.5 mm is obtained, as well as a sufficiently large test aperture (approximately 0.6) for a sufficient signal level on the respective light-sensitive element. Advantageously in this case, the aperture of the coupling-out optical system MSVG is settable by means of the width of the transmission opening DU2 and is here selected, corresponding to the larger radiative emission angle of the optical waveguide LW1, to be larger than the slot width DU1 of FIG. 13.

The focal length of the optical system is advantageously selected so that it is sufficiently large for a good correctability, and the spacing from the coupling-out position to the sensor line SZ remains below 40 mm at a magnification of approximately 3.5.

In this way, it is advantageously possible, by means of the coupling-out optical system MSVG also to bridge a greater distance from the coupling-out positions of the radiation fields EF1–EF5 to the test line SZ, as may for example be predetermined by a housing which surrounds the coupling device KR7. The means for improved decoupling of adjacent radiation fields are in this case in each instance advantageously adapted to the boundary conditions, as represented for example by the spacing of the coupling-out positions of the radiation fields to the test line SZ, the size of the light-sensitive elements, the waveguide spacing on the connecting line BL in the optical waveguide band BL71, etc.

The means for improved decoupling of adjacent radiation fields, in this case specifically the coupling-out optical system MSVG, are, seen overall, to be designed so that an object region with the radiation fields emerging selectively at the coupling-out positions is transformed into a predeterminable image region with the light-sensitive elements, the radiation fields remaining decoupled.

We claim:

1. A test device for a plurality of optical waveguides using an optical receiver, which exhibits a coupling device as well as at least two light-sensitive elements disposed in the radiation field of an emission signal to be coupled out and with which an evaluating devices is associated, the improvement comprising said coupling device being designed in such a manner that at least two optical waveguides are insertable alongside one another side-by-side in an ordered structure so that the waveguides exhibit independent radiation fields lying alongside one another in a total field, said light-sensitive elements being arranged in said total field, said light-sensitive elements being disposed and aligned with respect to their reception characteristics in such a manner that they pick up different parts of said radiation in the total field and produce a separate test signal for each light-sensitive element, and the evaluating device separately evaluating the test signals of the individual radiation fields which are recorded by the individual light-sensitive elements.

2. A test device as claimed in claim 1, wherein the optical waveguides are disposed parallel alongside one another in the coupling device.

3. A test device as claimed in claim 2, wherein the optical waveguides are mechanically connected to one another to form a strip line.

4. A test device according to claim 1, wherein the coupling device is designed as a flexural coupler.

5. A test device according to claim 1, wherein the coupling device is a reception-side coupling device being formed by the light-sensitive element coupled directly onto the ends of the optical waveguides.

6. A test device according to claim 1, wherein the light-sensitive elements are disposed in a line structure or in a laminar array structure.

7. A test device according to claim 1, wherein the centers of the light-sensitive elements of the coupling device are aligned in each instance with respect to the pertinent cores of the optical waveguides lying alongside one another.

8. A test device according to claim 1, which includes an adjustment device for the optimization of the association between the light-sensitive elements and the associated radiation fields.

9. A test device according to claim 1, wherein more than two optical waveguides lying alongside one another on the coupling device and the number of light-sensitive elements is selected to be smaller than the number of optical waveguides.

10. A test device according to claim 1, wherein the number of light-sensitive elements is selected to be equal to the number of optical waveguides lying alongside one another on the coupling device.

11. A test device according to claim 1, wherein the number of light-sensitive elements is selected to be larger than the number of optical waveguides lying alongside one another.

12. A test device according to claim 1, which includes shields being provided, and being disposed in such a manner that they give a decoupling of adjacent radiation fields.

13. A test device according to claim 12, wherein the shields are disposed parallel to the plane of symmetry of the radiation fields.

14. A test device according to claim 1, wherein the evaluating device includes a readout device, which temporally samples the test signals recorded by the light-sensitive elements.

15. A test device according to claim 1, wherein the evaluating device includes a computer unit with a test value memory so that the test signals recorded by the light-sensitive elements can be functionally linked with one another in such a manner that for each optical waveguide the associated optical characteristic quantities are selectively evaluated.

16. A test device according to claim 1, wherein the test device is a component part of an optical waveguide splice device with a splice location.

17. A test device according to claim 16, which includes means for the alignment of the optical waveguides lying alongside one another at the splice location.

18. A test device according to claim 1, wherein the test device is a component part of an optical waveguide attenuation test device.

19. A test device according to claim 1, wherein means for enhancing decoupling of adjacent radiation fields are provided between the coupling out position and the light-sensitive elements.

20. A test device according to claim 1, wherein waveguides are connected together on a connecting line and each of the radiation fields has a greater spread transverse to the connecting line than along the connecting line.

21. A test device according to claim 1, wherein the waveguides are connected together along a connecting line, and which includes means for enhancing a spread of the radiation fields in a direction transverse to the connecting line being provided between a coupling-out position of the radiation fields out of the optical waveguide and the associated light-sensitive elements.

22. A test device according to claim 1, wherein the waveguides are connected together along a connecting line, and which includes means disposed between the coupling-out position of the optical waveguides and the associated light-sensitive elements for narrowing each radiation field in a region of the light-sensitive elements in a direction along the connecting line of the optical waveguides.

23. A test device according to claim 1, wherein the waveguides are connected along a connecting line and wherein illuminated spots formed in each instance by the radiation fields in the region of the light-sensitive elements are larger in the direction transverse to the connecting line of the optical waveguides, in particular at least twice as large, as compared with the direction along the connecting line of the optical waveguides.

24. A test device according to claim 1, wherein a coupling-out optical system is provided between a coupling-out position of the optical waveguides and the light-sensitive elements.

25. A test device according to claim 1, wherein the waveguides are connected along a connecting line, and wherein in each instance, the spread of the radiation fields in a direction along the connecting line of the optical waveguides is selected to be so small that in each instance in the region of the reception elements adjacent illuminated spots do not overlap or overlap only as little as possible.

26. A test device according to claim 5, which includes optical imaging means being provided between the coupling-out positions of the optical waveguides and the light-sensitive elements, the imaging characteristic of said means being selected so that the decoupling of adjacent radiation fields is improved.

27. A test device according to claim 1, wherein the optical receiver is designed so that at least one light-sensitive element is displaceable relative to the optical waveguide being tested transversely to a direction of propagation of the radiation fields.

28. A test device according to claim 1, wherein the optical receiver is designed so that the coupling device with the waveguides to be tested are disposed to be displaceable relative to at least one light-sensitive element transversely to the direction of propagation of the radiation fields.

29. A method for using a test device having an optical receiver which includes a coupling device as well as at least two light-sensitive elements disposed in radiation fields of emission signals being coupled out of at least two optical waveguides and an evaluating device for separately evaluating the individual radiation fields, the method comprising the steps of inserting at least two optical waveguides alongside one another in the coupling device so that independent radiation fields lying alongside one another are formed, aligning the light-sensitive elements in relation to the independent radiation fields for sensing different parts of said independent radiation fields and separately evaluating selected test signals created by the light-sensitive elements from corresponding independent radiation fields.

\* \* \* \* \*